United States Patent
Reams, III

(10) Patent No.: US 7,978,685 B1
(45) Date of Patent: Jul. 12, 2011

(54) SYSTEM AND METHOD FOR PACKET-BASED VOICE TELEPHONY FOR USE IN RECEIVING CALLS DURING DIAL-UP INTERNET SESSIONS

(75) Inventor: Orin Paul Reams, III, Charles Town, WV (US)

(73) Assignee: Sprint Communications Company L.P., Overland Park, KS (US)

(*) Notice: Subject to any disclaimer, the term of this patent is extended or adjusted under 35 U.S.C. 154(b) by 1512 days.

(21) Appl. No.: 10/991,018

(22) Filed: Nov. 17, 2004

Related U.S. Application Data

(60) Provisional application No. 60/526,157, filed on Dec. 2, 2003.

(51) Int. Cl.
*H04L 12/66* (2006.01)
(52) U.S. Cl. ...................... 370/352; 379/88.17
(58) Field of Classification Search .......... 370/352–356; 379/215.01, 88.17, 221.08
See application file for complete search history.

(56) References Cited

U.S. PATENT DOCUMENTS

| | | | | |
|---|---|---|---|---|
| 6,028,917 A * | 2/2000 | Creamer et al. | ......... | 379/100.01 |
| 6,078,581 A * | 6/2000 | Shtivelman et al. | .......... | 370/352 |
| 6,125,126 A * | 9/2000 | Hallenstål | ..................... | 370/522 |
| 6,125,177 A * | 9/2000 | Whittaker | ..................... | 379/243 |
| 6,144,644 A * | 11/2000 | Bajzath et al. | ................ | 370/259 |
| 6,345,047 B1 * | 2/2002 | Regnier | ......................... | 370/352 |
| 6,351,464 B1 * | 2/2002 | Galvin et al. | ................. | 370/356 |
| 6,463,146 B1 * | 10/2002 | Hartley et al. | ............ | 379/215.01 |
| 6,507,646 B1 * | 1/2003 | Fishler | ...................... | 379/215.01 |
| 6,661,785 B1 * | 12/2003 | Zhang et al. | .................. | 370/352 |
| 7,352,850 B1 * | 4/2008 | Cericola et al. | .......... | 379/112.05 |
| 2003/0050060 A1 * | 3/2003 | Leslie et al. | .................. | 455/427 |
| 2003/0215078 A1 * | 11/2003 | Brahm et al. | ............ | 379/211.02 |
| 2004/0042444 A1 * | 3/2004 | Edmon et al. | ................. | 370/352 |

* cited by examiner

*Primary Examiner* — Simon Sing

(57) ABSTRACT

The present invention provides a system and method for receiving incoming voice telephone calls during a dial up internet session. An incoming telephone call to a telephone line in use for a dial-up internet session may be forwarded to a predetermined telephone number. When the incoming voice telephone call is received at the predetermined telephone number, the internet user may be notified of the incoming telephone call and may be given the option of receiving the incoming call or taking other actions with the incoming call. If the internet user elects to receive the incoming voice telephone call, the incoming voice telephone call is forwarded to the internet user's computer using a protocol for establishing voice telephony over a packet-based network, such as voice over internet protocol.

12 Claims, 4 Drawing Sheets

SYSTEM AND METHOD FOR PACKET-BASED VOICE TELEPHONY FOR USE IN RECEIVING CALLS DURING DIAL-UP INTERNET SESSIONS

CROSS-REFERENCE TO RELATED APPLICATIONS

This application claims priority pursuant to 35 U.S.C. Section 119(e) from U.S. Provisional Application No. 60/526,157 filed Dec. 2, 2003.

STATEMENT REGARDING FEDERALLY SPONSORED RESEARCH OR DEVELOPMENT

None.

TECHNICAL FIELD

The present invention relates to the receipt of voice telephone calls by an interne user utilizing a dial-up interne connection. More particularly, the present invention provides a system and method for notifying an interne user of an incoming voice telephone call and delivering the voice telephone call to the internet user's computer using a packet-based voice telephony protocol such as voice-over-internet protocol.

BACKGROUND OF THE INVENTION

Many people are familiar with the internet. For many people, the internet is a valuable, perhaps even necessary, resource in their everyday life.

The basics of connecting to the internet are well understood by those of ordinary skill in the art and need not be repeated here. Essentially, an internet user's computer must be connected to the servers and/or other computing resources that provide internet content. As used herein, an internet user's computer may be any device capable of connecting to the internet, such as a desktop computer, a laptop computer, a tablet computer, a personal digital assistant (PDA), a telephone, a mobile telephone, or any other communication device or data appliance. An internet user's computer may be connected to the interne in any of a variety of ways, all of which are likely to be familiar to one of ordinary skill in the art.

One of ordinary skill in the art is likely to be familiar with the popular method of connecting to the internet using a dial-up internet connection. A dial-up internet connection utilizes a circuit-based telephone line to connect a call between an internet user's computer and a server or other gateway to the internet. A modem or other device may be used to convert between the circuit-based connection and the packet-based communications used by the internet user's computer and the server or other gateway. One of ordinary skill in the art will be familiar with a wide variety of modems and similar devices for use in converting between circuit-based and packet-based communications.

A disadvantage of dial-up internet access is that, during an internet session, the internet user's telephone line is occupied, preventing others from being able to complete a telephone call to the internet user's telephone number. Some dial-up internet users attempt to overcome this disadvantage by obtaining a second phone line, but many are unwilling to incur the expense of an additional telephone line.

SUMMARY OF THE INVENTION

The present invention provides a system and method for notifying a dial-up internet user of an incoming telephone call during a dial-up internet session. When an incoming telephone call is received at the local switch of a dial-up internet user engaged in an internet session, the call may be forwarded to a predetermined telephone number. When the incoming call is received at the predetermined telephone number, the internet user may be notified by the internet service provider of the incoming telephone call and given an option to receive the incoming call. If the interne user chooses to receive the call, the call may be directed to the internet user's computer using a protocol for establishing voice telephony over a packet-based network, such voice over internet protocol (VoIP).

DETAILED DESCRIPTION OF THE INVENTION

Figure 1:
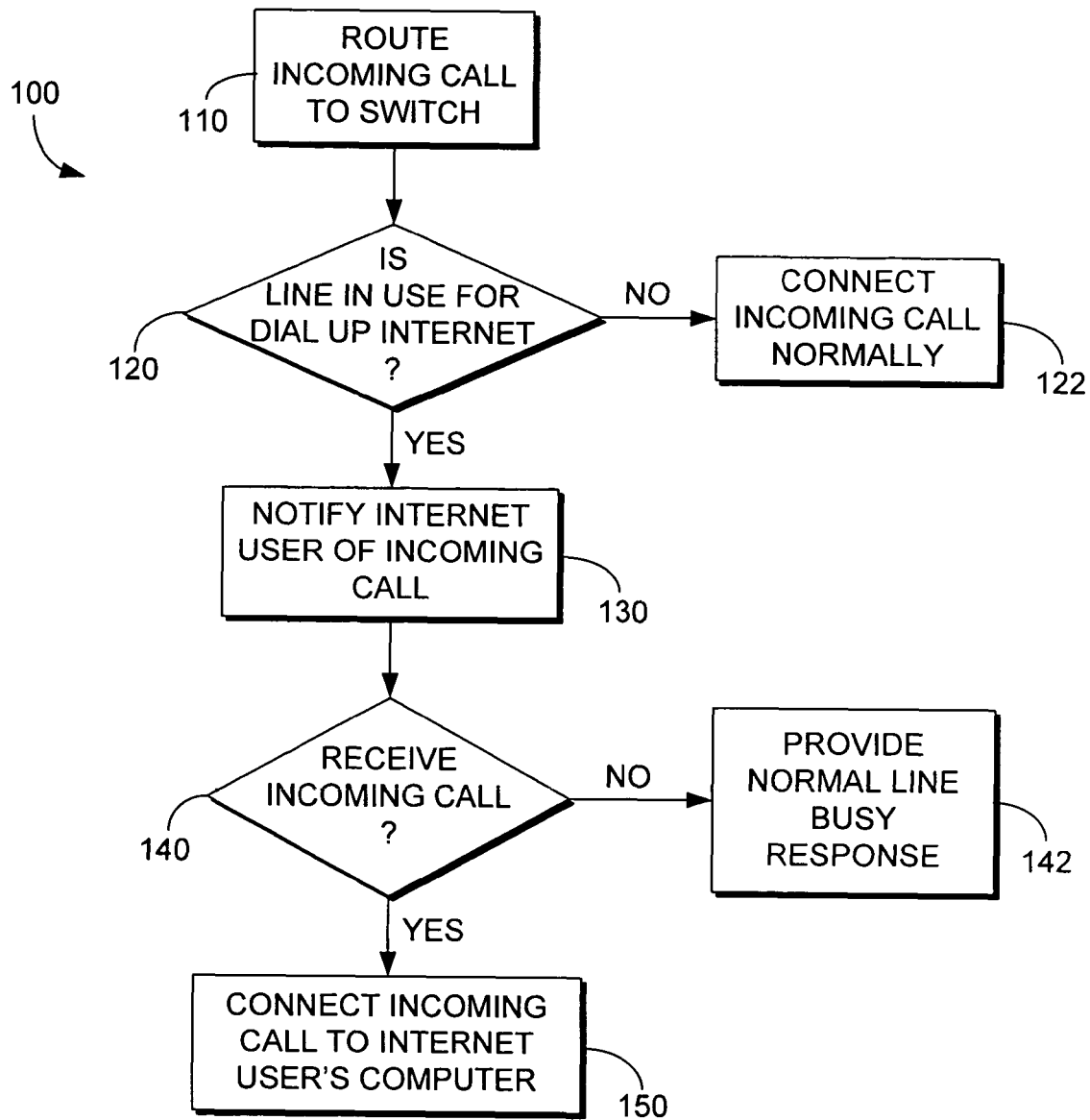
FIG. 1 illustrates a method in accordance with the present invention for receiving an incoming voice telephone call during a dial-up internet session.

Referring now to FIG. 1, a method 100 for receiving an incoming voice telephone call during a dial-up internet session is illustrated. In step 110 an incoming call is routed to the internet user's local telephony switch. Step 110 may occur in the public switched telephone network (PSTN). In step 120, it is determined whether the telephone line of destination telephone number is in use for dial-up internet access. If the line is not in use for dial-up internet access, the call may be connected normally in step 122. If, however, the line is in use for dial-up internet access, method 100 proceeds to step 130. In step 130, the internet user is notified of the incoming call. Step 130 may be performed by the internet service provider and may be performed in a variety of fashions, such as pop-up window on the internet user's computer display. Such a pop-up window may include further attributes of the incoming call, such as the identity of the caller. One skilled in the art will appreciate that a variety of other means may be used to perform step 130, such as the use of audible tones or the use of visual displays other than a pop-up window. In step 140, the internet user may select whether to receive the incoming call. If the interne user does not select to receive the incoming call, method 100 may proceed to step 142. In step 142, the caller is provided with the normal line busy response. The normal line busy response may be a variety of actions, such as transmitting a busy tone to the caller or forwarding the incoming call to a voice mail account. If the internet user elects to receive the incoming call, method 100 proceeds to step 150. In step 150, the incoming call is connected to the user's computer. Step 150 may be performed using a protocol to establish voice telephony over a packet-based network. One such protocol that will be familiar to one of ordinary skill in the art is the voice-over-internet protocol, although other protocols could alternatively be used.

In further reference to FIG. 1, it should be noted that step 140 and step 142 may be omitted from method 100. If these steps are omitted, the incoming call would be connected to the internet user's computer without presenting an opportunity for the Internet user to choose whether to receive the incoming call. Furthermore, step 130 may be omitted as well. In most applications of the present invention, however, it may be anticipated that an internet user will desire to be notified of an incoming voice telephone call and given an opportunity to select to receive or ignore the incoming call.

Figure 2:
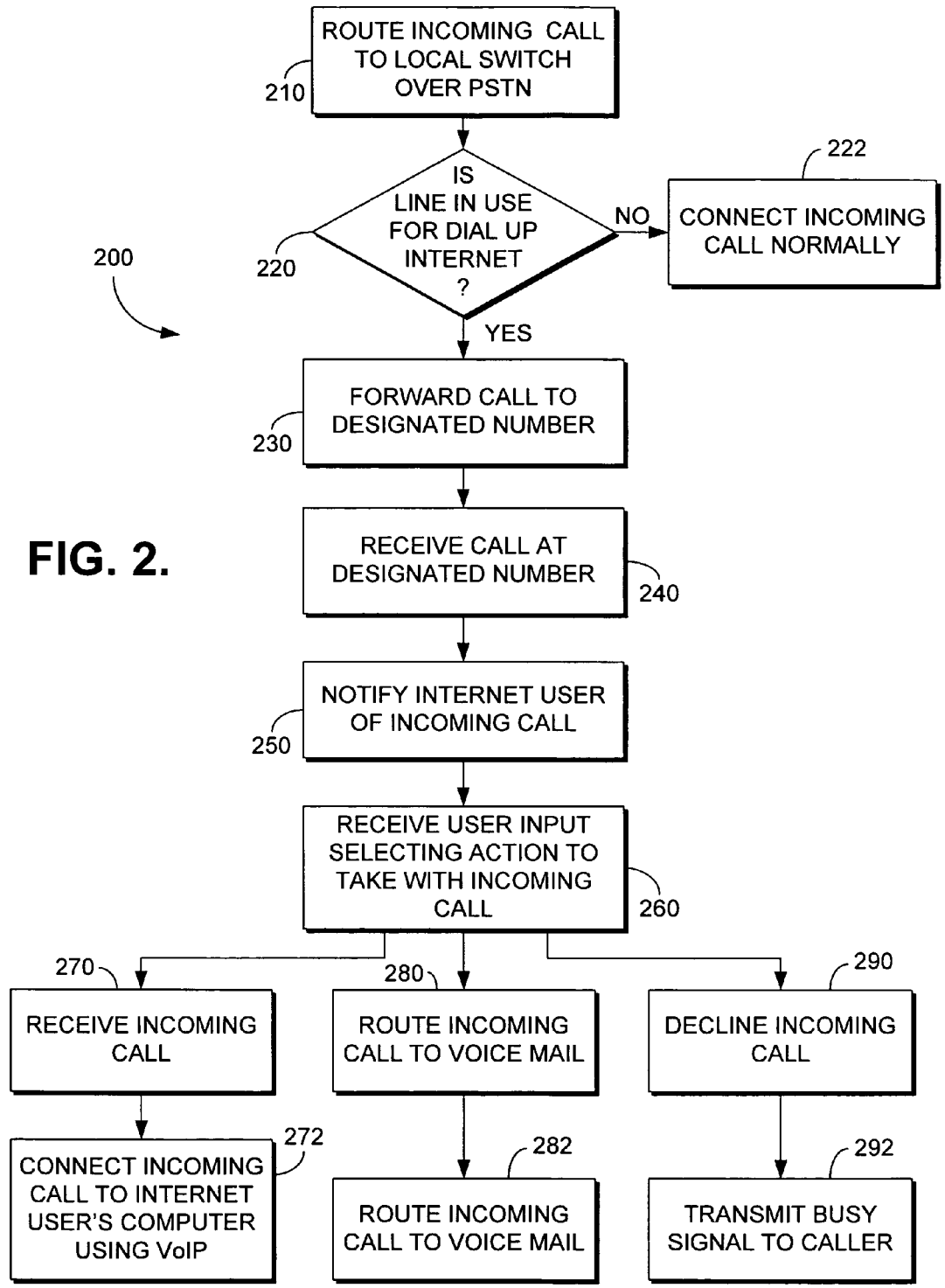
FIG. 2 illustrates a further method in accordance with the present invention for receiving an incoming voice telephone call during a dial-up internet session.
Figure 3:
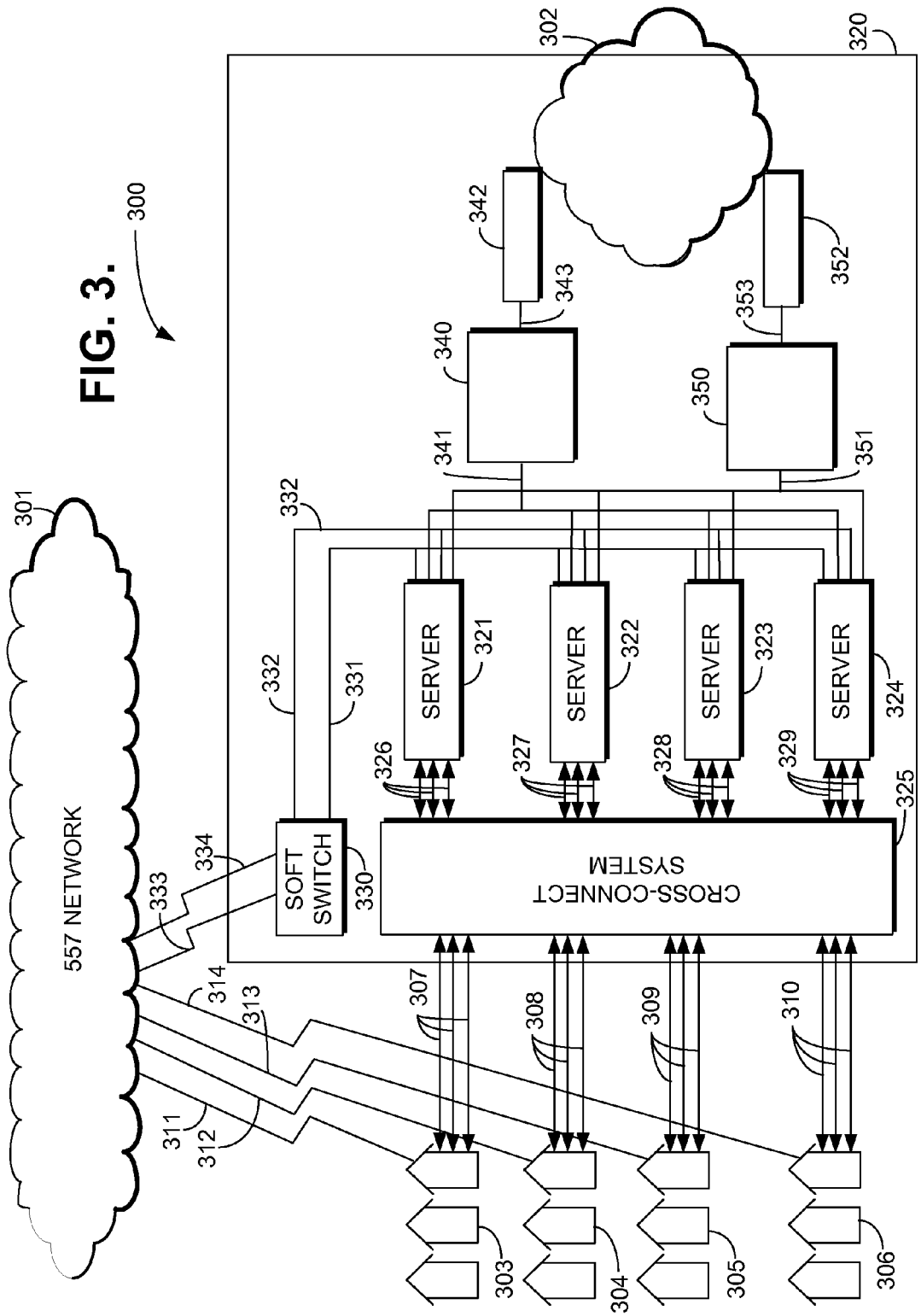
FIG. 3 illustrates a system in accordance with the present invention for receiving an incoming voice telephone call during a dial-up internet session.
Figure 4:
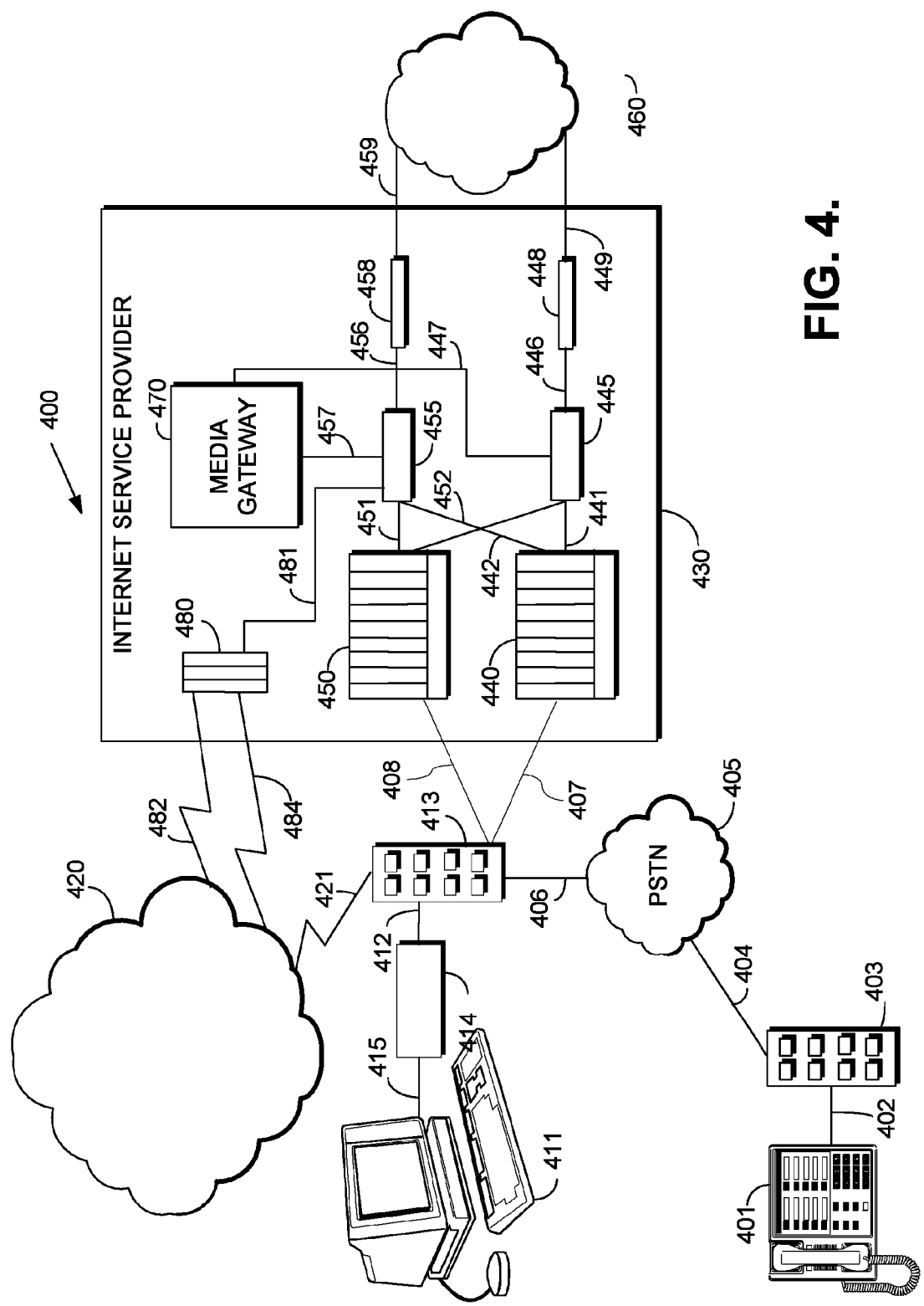
FIG. 4 further illustrates a system in accordance with the present invention for receiving an incoming voice telephone call during a dial-up internet session.

In reference now to FIG. 2, a further method 200 in accordance with the present invention for receiving an incoming voice telephone call during a dial-up internet session is illustrated. In step 210, an incoming voice telephone call is routed to a local switch over the PSTN. In step 220, it is determined whether the telephone line corresponding to the destination telephone number is in use for dial-up internet access. If the line corresponding to the destination telephone number is not in use for dial-up internet access, method 200 proceeds to step 222 of connecting the incoming voice telephone call normally. If the line corresponding to the destination telephone number is in use for dial-up internet access, method 200 proceeds to step 230. In step 230 the incoming call may be forwarded to a designated telephone number. Step 220 and step 230 may be combined into a single step. One of ordinary skill in the art will be generally familiar with the concept of forwarding a telephone call to another telephone number. In accordance with the present invention, the forwarding of calls may be activated when an internet service provider (ISP) access number is dialed, at any time the telephone line is in use, or by other methods. The designated telephone number to which an incoming call is forwarded in step 230 may be a local number relative to the destination telephone number, and may even be a number serviced by the same trunk group. The use of such a local number may significantly decrease the cost of implementing methods in accordance with the present invention, but the use of such a local number is not necessary in accordance with the present invention. In step 240, the incoming voice telephone call is received at the designated number. In step 250, the internet user is notified of the incoming voice telephone call. As with step 130 of method 100, step 250 may take a variety of forms, such as the use of a pop-up window, although a variety of other types of notification may be used. In step 260, user input selecting an action can be taken with the incoming voice telephone call received. Any number of actions may be taken with an incoming voice telephone call in method 200, some of which are illustrated in FIG. 2. For example, an internet user may elect to receive the call in step 270. Method 200 would then proceed to step 272, and the incoming call would be connected to the internet user's computer using voice over IP or similar protocols. Alternatively, the internet user may elect to route the incoming voice telephone call to voice mail in step 280. In this case, the incoming call would be routed to the internet user's voice mail in step 282. By way of further example, the internet user may elect to decline the incoming voice telephone call in step 290. In this case, method 200 would proceed to step 292 of transmitting a busy signal or an announcement to the caller. One skilled in the art will appreciate that any number of actions may be taken with an incoming voice telephone call beyond the examples described herein FIG. 3 and FIG. 4 illustrate an example of a system in accordance with the present invention for receiving incoming voice telephone calls during dial-up internet sessions. It will be appreciated by one of ordinary skill in the art that equipment and components other than the examples shown in FIG. 3 and FIG. 4, as well as other equipment configurations, may be used with a system in accordance with the present invention. FIG. 3 shows an embodiment of a dial IP network 320. The dial IP network 320 connects to a signaling system 7 (SS7) network 301 and one or more local exchange carriers identified by 303, 304, 305 and 306. Dial IP network 320 consists of a series of trunks 307, 308, 309 and 310 connecting the local exchange carriers 303, 304, 305, and 306 to a digital access and cross connect system 325. The digital access and cross connect system 325 allows high volume telephone traffic to reach the dial IP network 320 to connect over links 326, 327, 328, and 329 to one or more remote access servers 321, 322, 323, and 324. The remote access servers 321, 322, 323, and 324 provide the conversion of data from a synchronous telephone network to a packet-based network. The remote access servers 321, 322, 323, and 324 connect to one or more switches 340 and 350 and routers 342 and 352 for access to an internet protocol network 302. The remote access servers 321, 322, 323, and 324 receive signaling instructions to establish a telephone path via one or more pairs of internet protocol device control (IPDC) links 331 and 332 connected between the remote access servers 321, 322, 323, and 324 and an internet call diversion (ICD) Softswitch 330. The ICD Softswitch 330 interfaces the dial IP network 320 to the SS7 network 301 using A-links 333 and 334.

Each Dial IP network 320 may house at least two remote access servers 321, 322, 323, and 324, incrementing in sets of two for redundancy and capacity. The ICD Softswitch 330 may be co-located with the remote access servers 321, 322, 323, and 324. The remote access servers 321, 322, 323, and 324 may be acquired from any vendor. The remote access servers 321, 322, 323, and 324 may have voice over IP hash codes enabled.

FIG. 4 shows an embodiment of the IP Dial Call Alert Service 400. The new Dial IP Call Alert Service architecture can exist in various configurations. This example consists of adding a Media Gateway 470. The remote access servers 440 and 450 at the site are connected to a set of switches 445 and 455, which are connected to routers 448 and 458. The routers 448 and 458 are connected to a IP network 460 by a group of circuits 449 and 459. The remote access servers 440 and 450 may use digital signals 3 (DS3s) carrying integrated services user part (ISUP) trunks 407 and 408 to interface with the PSTN 405 through a telecom switch A 413. Dial point-to-point protocol (PPP) users may be assigned IP addresses from a local pool in the remote access servers 440 and 450 after authentication. This will make routing in the site less complex, and will permit ports to be shared among the different customers. Other customer-specific configurations may be assigned by the remote access servers 440 and 450 based on the dialed number information (DNIS) acquired from the PSTN 405 for every call.

The call flow for a dial-up internet user could resemble the following example. User A 411 subscribes to a premium Call Alert Service with their ISP provider. The ISP provider contacts User A's local exchange carrier to place a remote call forwarding telephone number on that user's telephone number to a local telephone number for that calling area. A unique telephone number would be assigned for all remote call forwarding based on ISP for simplified billing and utilization purposes.

When User A 411 dials up the local ISP telephone number, the call may connect from the telecommunication switch A 413 through the next available trunk and circuit to the available remote access servers 440 and 450. All call setup may be performed out-of-band via the SS7 network 420 from the telecommunication switch A 413 to an ICD Softswitch 480. The ICD Softswitch 480 may query the appropriate remote access servers 440 and 450 if it has available resources to answer the inbound call. If the remote access servers 440 and 450 signal that they can accept the call, the ICD Softswitch 480 may signal the telecommunication switch A 413 to allow the call through. If the ICD Softswitch 480 rejects the call, the ICD Softswitch 480 may signal the telecommunication switch A 413 provide a "release code" and send a local announcement to be played by the telecommunication switch A 413. Once the call is allowed through, the modem 414 synchronizes up and negotiates connection speeds, and then a username and password may be sent to be authenticated. Once User A 411 is authenticated and is assigned group parameters based on realm and domain, User A's IP Address may be registered with the Media Gateway 470 for its duration online and the user is free to surf the web or download content, and otherwise engage in a dial-up internet session.

While User A 411 is dialed in online, they are unable to accept telephone calls unless they disconnect from the ISP. However, this design overcomes that limitation of dial-up internet access.

In this example, while User A 411 is dialed in to the ISP modems, User B 401 attempts to call User A 411. Telecommunication switch A 413 may receive an SS7 Setup message for User A's telephone number and may determine that User A's telephone line is busy and perform a remote call forwarding to the local telephone number that was provided by the ISP. Telecommunication switch A 413 may find an available circuit to the trunk group and signal the ICD Softswitch 480 of an incoming call on remote access servers 440 and 450. The ICD Softswitch 480 may determine, based on the remote called forwarding number, that this call is a Call Alert phone call and signal the Media Gateway 470 across the IP-based Ethernet Switches 445 and 455.

The Media Gateway 470 may then perform a lookup on the Called Party Number that it received from the ICD Softswitch 480. User A's telephone number may be registered in it's online database and associated with a specific IP Address. The Media Gateway 470 may then query User A's computer via IP that it has an incoming voice call. A pop-up window may appear that provides the Calling Party Number (User B's telephone number) and asks User A 411 if they wish to accept the call. User A 411 may either click YES to accept, NO to reject, or VM to forward the call to voice mail as an example of one embodiment. If User A 411 clicks NO to reject, then the Media Gateway 470 may signal the ICD Softswitch 480, the ICD Softswitch 480 may signal telecommunication switch A 413, and telecommunication switch A 413 may signal telecommunication switch B 403 to release the call and provide a "release code." The "release code" may signal telecommunication switch B 403 to play a voice announcement to User B 401, an example of which is: "The party you're dialing is currently online and does not wish to be disturbed. Please try your call again in a little while. Thank you." Alternative actions, such as those described in conjunction with FIG. 2, may also be used.

If User A 411 clicks to accept the call, then the Media Gateway 470 may initiate a Voice over IP call utilizing either the H.323 protocol or session initiated protocol (SIP) to software on User A's computer. Simultaneously, the Media Gateway 470 may signal to the ICD Softswitch 480, to signal the telecommunication switch A 413, to signal telecommunication switch B 403 to allow the call through onto remote access servers 440 and 450.

Once the forwarded call is connected through on the remote access servers 440 and 450, a Voice over IP real-time transport (RTP) stream may be created and sent via IP across the Ethernet Switches 445 and 455 to the Media Gateway 470. The VoIP RTP stream is converted to either H.323 or SIP protocol and routed to User A's software on their computer. User A 411 will be able to hear User B 401 via the computer speakers and talk via the computer microphone. Communication from User A 411 to User B 401 is accomplished by reversing the call flow back to the Media gateway 470.

If User A 411 clicks to send the call to voice mail, the call is sent to an application server for User B 403 to record a message. User B 403 is allowed to leave a predetermined length recording that can be saved as a .WAV file or any other format file to be listened to later by User A 411. Although this is one exemplary embodiment of the invention, several methods can be implemented to retrieve voice mail messages. User A 411 can have direct access to the application server to retrieve the message. Or, the application server can email the voice message to User A's email box using a predetermined email address.

One skilled in the art will appreciate that FIG. 1 and FIG. 2 illustrate two examples of methods in accordance with the present invention for receiving voice telephone calls during a dial-up internet session and that FIG. 3 and FIG. 4 illustrate an example of a system in accordance with the present invention for receiving voice telephone calls during a dial-up internet session. While methods in accordance with the present invention have been described in conjunction with specific protocols, such as voice over internet protocols, one skilled in the art will appreciate that other protocols may be used. One skilled in the art will further realize that some of the steps illustrated in conjunction with the methods in accordance with the present invention, such as notifying an internet user of an incoming voice telephone call and allowing an internet user to select an action to be taken with an incoming voice telephone call, may be dispensed with, although they may be determined to be advantageous to many internet users. One skilled in the art will further appreciate that the examples of suitable equipment for use in a system in accordance with the present invention are exemplary only and that other equipment and other configurations of equipment may also be used in systems in accordance with the present invention. These and a variety of other variations upon the present invention will be understood by those of ordinary skill in the art.

The invention claimed is:

1. A method for notifying an internet user that is already connected to a dial-up internet session over the internet user's telephone line of a telephone call, wherein the method comprises:

facilitating by at least one telecommunication switch a first telephone call from the internet user over a public switched telephone network (PSTN) to an internet service provider;

connecting the first telephone call through the at least one telecommunication switch in a circuit-based network when the internet user makes the first telephone call over the PSTN to the internet service provider, wherein the circuit-based network is a synchronous network;

linking the first telephone call from the at least one telecommunication switch through at least one remote access server in a packet-based network wherein the remote access server provides a conversion of data from the circuit-based network to the packet-based network;

converting between the circuit-based and packet-based networks in the remote access server to establish an internet connection between the internet user's computer and the internet service provider wherein the remote access server receives signaling instructions to establish a telephone path over one or more internet protocol device control links;

enabling the dial-up internet session over the first telephone call;

receiving at the internet service provider an incoming telephone call directed to the telephone number of the internet user while the internet user is engaged in the dial-up internet session, the incoming telephone call being forwarded over the packet-based network to notify the internet user of the incoming telephone call at the internet user's computer;

connecting the incoming telephone call to the internet user's computer using a packet-based communication protocol while the circuit-based telephone line is in use for the dial-up internet session; and sending a plurality of packets to the internet user's computer to cause a pop-up window to appear at the internet user's computer with identification information of the incoming telephone call and at least one button to select with a pointing device connected to the internet user's computer to select treatment of the incoming telephone call.

2. The method of claim 1, wherein receiving at the internet service provider an incoming telephone call directed to the telephone number of the internet user while the internet user is engaged in the dial-up internet session, the incoming telephone call being forwarded over a packet-based network to notify the internet user of the incoming telephone call at the internet user's computer comprises:

transmitting a message over the internet to the internet user's computer at the telephone number, the message informing the internet user of the incoming telephone call.

3. The method of claim 1, wherein connecting the incoming telephone call to the internet user's computer using a packet-based communication protocol while the circuit-based telephone line is in use for the dial-up internet session comprises:

converting between a circuit-based voice telephone call and voice over internet protocol call.

4. The method of claim 2 wherein transmitting a message over the internet to the internet user's computer at the telephone number, the message informing the internet user of the incoming telephone call further comprises:

transmitting the message over the internet to the internet user's computer identifying an origination of the incoming telephone call.

5. The method of claim 1 wherein sending a plurality of packets to the internet user's computer to cause a pop-up window to appear at the internet user's computer with identification information of an incoming telephone call and at least one button to select with a pointing device connected to the internet user's computer to select treatment of the incoming telephone call comprises:

receiving an indication of the incoming telephone call at the internet user's computer connected to a packet-based network;

displaying at the internet user's computer an option for handling the incoming telephone call; and receiving a selection for the option for handling the incoming telephone call.

6. The method of claim 5 wherein receiving an indication of the incoming telephone call at the internet user's computer connected to a packet-based network comprises:

receiving the pop-up window at the computer containing identification information of the telephone call from a calling party and at least one of a plurality of buttons to select with a pointing device treatment of the incoming telephone call.

7. The method of claim 5 wherein receiving a selection for the option for handling the incoming telephone call comprises at least accepting the incoming telephone call and initiating a voice over internet protocol call, rejecting the telephone call causing a release of the incoming telephone call with a plurality of signals sent to at least one telecommunication switch to release the incoming telephone call connected to the calling party, and sending the incoming telephone call to voice mail causing an application server to record and store a voice mail message provided by the calling party to be listened to later by the internet user.

8. A method for notifying a dial-up internet user of an incoming telephone call and connecting the incoming telephone call to the dial-up internet user's computer without terminating the dial-up internet session wherein the method comprises:

receiving a request at a telecommunication switch to connect the incoming telephone call to an internet user;

determining the internet user's telephone line is engaged to an internet service provider for an internet session and is unable to accept the incoming telephone call;

forwarding the incoming telephone call to a pre-programmed telephone number in the telecommunication switch to enable routing of the incoming telephone call based on the internet service provider;

re-directing the incoming telephone call by at least one telephone switch using the telephone number assigned to the internet user to route through a circuit-based network then through a packet-based network;

associating the telephone number to an internet protocol address assigned to the internet user during the internet session;

connecting the incoming telephone call through a remote access server to the internet user's computer using the internet protocol address over the packet-based network wherein the remote access server converts between the circuit-based and packet-based networks, and wherein the remote access server receives signaling instructions to establish a telephone path over one or more internet protocol device control links; and receiving a pop-up window at the internet user's computer containing identification information of the incoming telephone call from a calling party and at least one of a plurality of buttons to select with a pointing device connected to the internet user's computer to select treatment of the incoming telephone call.

9. The method of claim 8 wherein re-directing a telephone call by at least one telephone switch using the telephone number assigned to the internet user to route through a circuit-based network then through a packet-based network comprises:

converting between a circuit-based voice telephone call and voice over internet protocol call through the remote access server.

10. The method of claim 8 wherein associating the telephone number to an internet protocol address assigned to the internet user during the internet session further comprises:

maintaining a database of internet protocol addresses for each internet user, the internet user identified by an assigned telephone number; and performing a database lookup identifying the internet protocol address assigned to the telephone number of the internet user.

11. A telecommunication system for notifying a dial-up internet user of an incoming telephone call during a dial-up internet session comprising:

at least one telecommunication switch connects a circuit-based telephone call to two or more telephones, and forwards circuit-based telephone calls based upon pre-programmed call forwarding instructions;

at least one remote access server converts signals between a circuit-based telephone network and packet-based network, establishes an internet connection with an internet service provider, connects to one or more switches and routers to access the packet-based network, receives signaling instructions to establish a telephone path over one or more internet protocol device control links, and receives forwarded telephone calls to be routed to an internet user from the at least one telecommunication switch;

a media gateway looks up the telephone number of the internet user being called, signals one or more telecommunication switches over a signaling network to establish and remove a telephone call, queries the internet user's computer in response to an inbound telephone voice call, and establishes telephone voice communications between the at least one telecommunication switch, the at least one remote access server, and the internet user;

a server database keeps and maintains the internet user's telephone number and assigned internet protocol address; and a plurality of links interconnects at least one telecommunication switch, one remote access server, the media gateway, and the server database to facilitate the transfer of voice and data communications, and allows data to transfer back and forth in order for the media gateway to route forwarded telephone calls based on the internet protocol address.

12. A computer readable storage medium having computer-useable instructions embodied thereon for causing a computer to perform a method for notifying a dial-up internet user of an incoming telephone call during a dial-up internet session, the method comprising:

signaling one or more telecommunication switches out-of-band over a signaling network to establish and remove telephone calls;

establishing a dial-up internet session whereby one or more remote access servers accept or deny a telephone call wherein the remote access server converts signals between a circuit-based telephone network and packet-based network, establishes an internet connection with an internet service provider, connects to one or more switches and routers to access the packet-based network, and receives signaling instructions to establish a telephone path over one or more internet protocol device control links;

separately receiving incoming telephone calls to connect to an internet user already connected to the dial-up internet session wherein receiving incoming telephone calls comprise signaling a media gateway to perform a lookup that matches a telephone number of the internet user to an internet protocol address of the internet user;

looking up the telephone number of the internet user being called in a database containing the internet protocol address of the internet user; and querying the internet user's computer in response to an inbound telephone voice call handled by a processor.

* * * * *